Oct. 1, 1946.    H. F. GEORGE    2,408,388
STEERING WHEEL
Filed Feb. 12, 1944    2 Sheets-Sheet 1
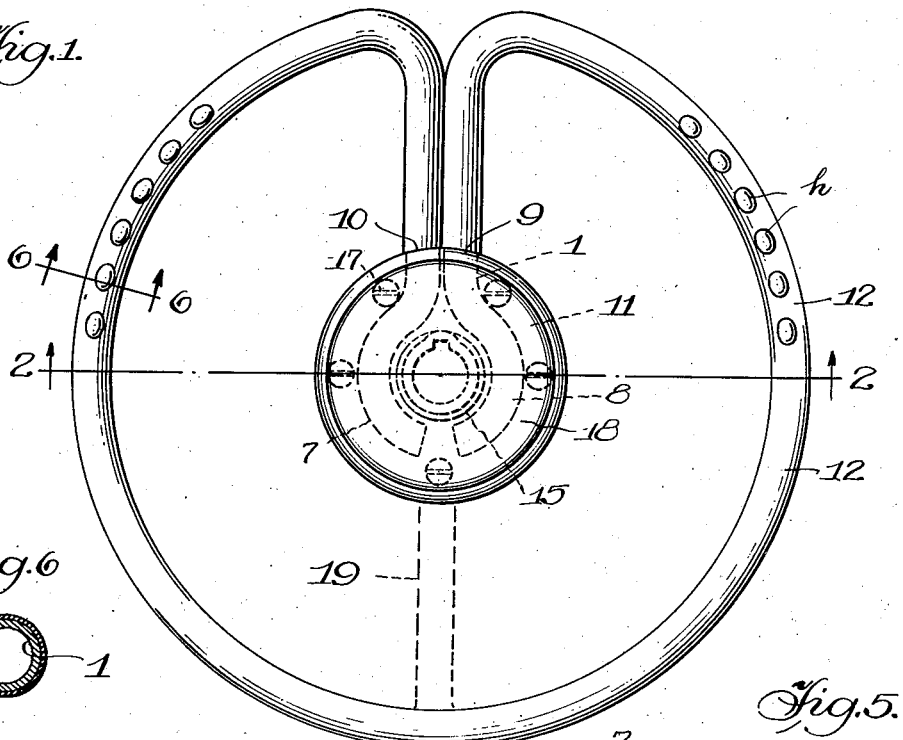
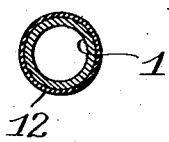
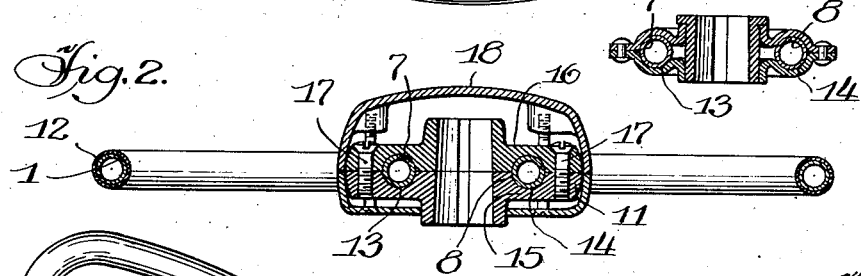
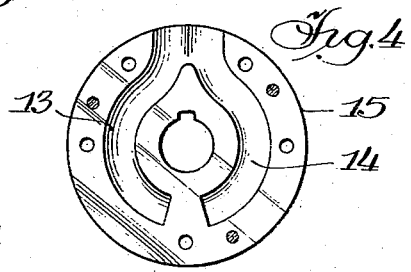
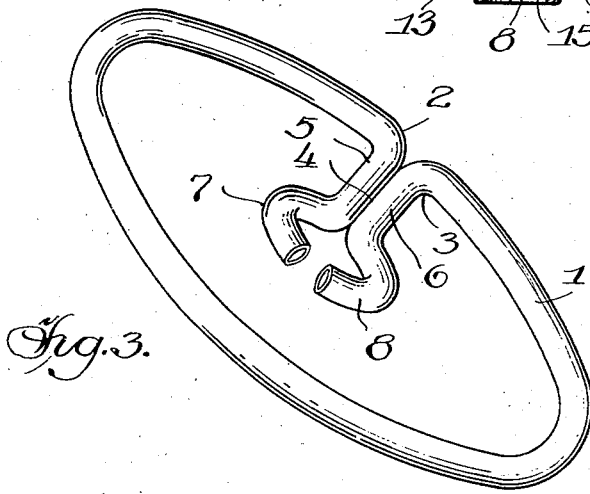
INVENTOR.
Harry F. George
BY
Parkinson + Lane
Attys

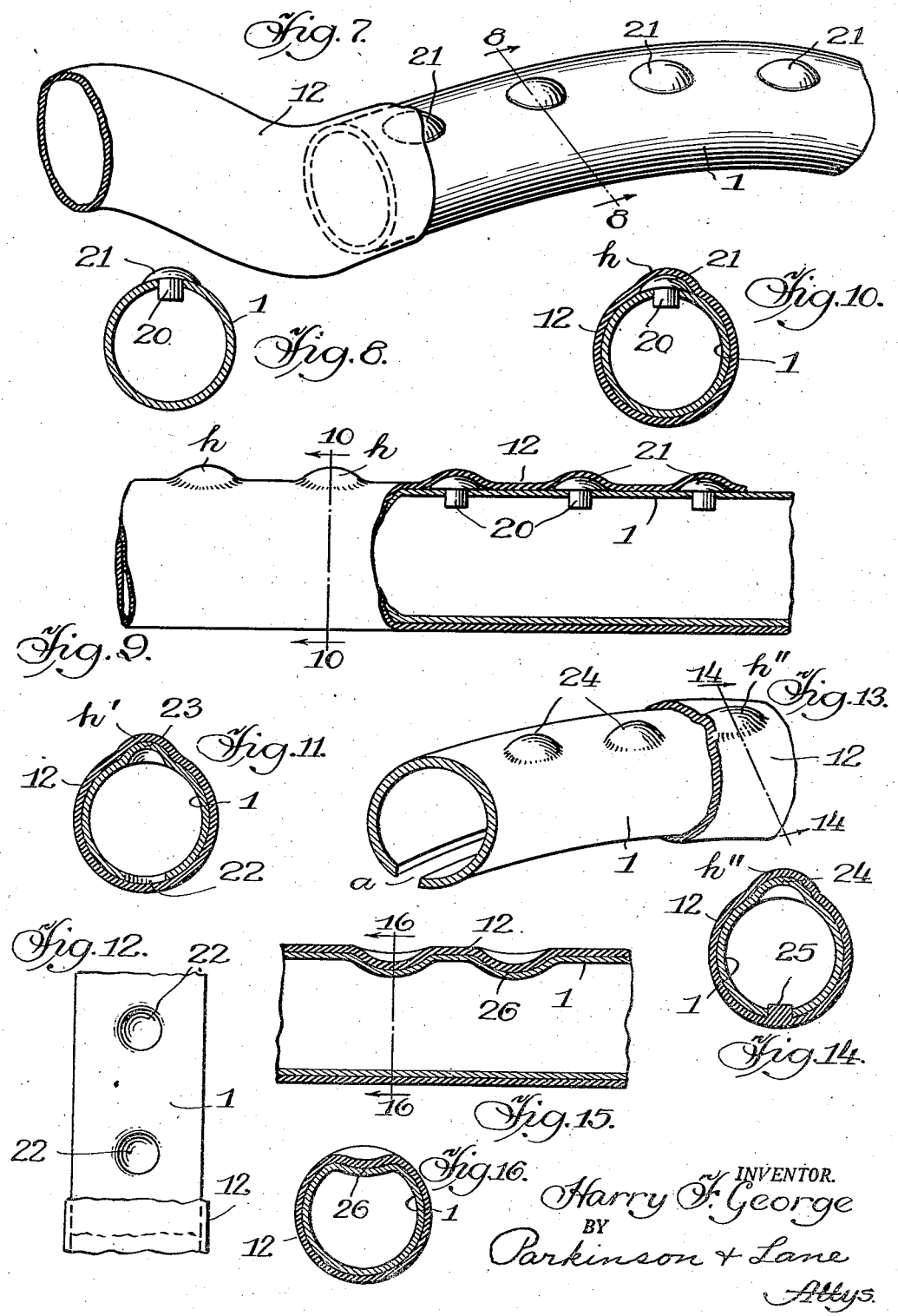

Patented Oct. 1, 1946

2,408,388

UNITED STATES PATENT OFFICE 2,408,388

STEERING WHEEL

Harry F. George, Chicago, Ill.

Application February 12, 1944, Serial No. 522,049

1 Claim. (Cl. 74—552)

This invention relates to a steering wheel, and while it is particularly adapted to steering wheels for automobiles and the like it is not limited thereto, but is capable of use in airplanes, motor boats, tanks and in many other instances to which it may be adapted. The structure is such as to greatly facilitate its effective and economical manufacture, and is of particular value in that it admirably lends itself to the ready application over the rim portion of a protective, ornamental and useful covering.

In the old forms of steering wheels prior to my present invention, there have been many complicated structures that have not possessed the desired combination of strength, economy of manufacture, and pleasing appearance. Also in the prior steering wheels, when it was desired to apply a decorative covering to the rim, the same, when such material as plastics or the like were used, would involve too great an expense for materials and molds, and would in many cases result in the development of cracks that would greatly mar the ornamental appearance, as well as lessen the efficiency, and be a menace to the safety of the operator.

Among the objects of my invention is to provide a steering wheel having a novel rim construction so formed as to enable an ornamental and useful tubular covering of yieldable material of the desired size, to be started over a free end of the rim structure and pulled therealong to cover the desired portion of the rim.

Another object is to provide a novel method of applying a tubular covering of yieldable material over the rim of the steering wheel.

A further object is to provide a novel method, and resulting structure, for forming finger grip projections or recesses in the steering wheel rim and covering therefor.

A still further object is to provide a novel method, and resulting structure, for applying to a steering wheel rim, a permanently or temporarily yieldable covering such as a plastic material, rubber, yieldable textile or fabric, or other material adapted to the purpose.

An additional object is to make use of a combined lubricant and cementing material when applying the yieldable tubular covering to the rim.

Another object is to make possible the use, as an ornamental rim covering, of a thermoplastic resin, rubber, or other suitable yieldable material.

Other objects, advantages and capabilities, inherently possessed by my invention, will later more fully appear.

My invention further resides in the combination, construction and arrangement of parts illustrated in the accompanying drawings, and while I have shown therein preferred embodiments, I wish it understood that the same are susceptible of modification and change without departing from the spirit of my invention.

In the drawings:

Fig. 1 is a top plan view of a steering wheel embodying my invention.

Fig. 2 is a transverse vertical section through the steering wheel on the line 2—2 of Fig. 1, with the cover housing in place over the hub.

Fig. 3 is a perspective view of the rim element of the wheel before having the hub clamping plates applied thereto.

Fig. 4 is a plan view of the grooved face of one of the hub clamping plates.

Fig. 5 is a transverse vertical section on a reduced scale of another form of hub construction.

Fig. 6 is a transverse vertical section on the line 6—6 of Fig. 1.

Fig. 7 is a fragmentary perspective view, on an enlarged scale, of a portion of the rim and a portion of a yieldable covering in position to be pulled longitudinally thereover.

Fig. 8 is a transverse vertical section on the line 8—8 of Fig. 7, before the covering is applied thereto.

Fig. 9 is a side view, partly in elevation and partly in vertical section, of the portion of rim shown in Fig. 7, and after the covering has been pulled longitudinally thereover.

Fig. 10 is a transverse vertical section on the line 10—10 of Fig. 9.

Fig. 11 is a view similar to Fig. 10 but showing a modified form of grip projection.

Fig. 12 is a bottom plan view of Fig. 11 but with the covering omitted except near the lower end, and showing the holes through which a tool is inserted for forming the grip.

Fig. 13 is a fragmentary perspective view of a portion of a rim of modified construction with the covering in position only partway thereover.

Fig. 14 is a vertical transverse section on the line 14—14 of Fig. 13.

Fig. 15 is a fragmentary vertical longitudinal section through a portion of the rim and covering, and showing a further modification.

Fig. 16 is a vertical transverse section on the line 16—16 of Fig. 15.

Referring more in detail to the drawings, my invention comprises a hollow tubular rim 1, preferably of metal, but including any material other than metal, that will adapt itself to the spirit of this invention. For illustrative purposes I have shown this tubular rim as being of one piece with its ends bent inwardly at 2 and 3 to preferably contact each other at 4 but not fastened together, so that in applying the covering these bent ends and arms 5 and 6 may be sprung apart sufficiently to permit the covering to pass over each of them individually as it is slid on over the rim. The inner end portions 7 and 8 of arms 5 and 6 are each curved, as shown in Figs. 1, 3 and 4, with their extreme inner ends unattached to each other, so that before being secured in the hub of the steering wheel these ends are free to have the covering passed on over either one of them, then all the way around the rim and back to the other arm with the ends of the covering terminating at 9 and 10 preferably in a position just outside of the hub 11.

The covering is designated generally at 12 and comprises a suitably yieldable material that may be pulled on, or otherwise forced over the rim, preferably around its entire circumferential length, although it may be stopped short of such distance if desired without departing from the spirit of my invention. For the covering material I may use any suitable thermoplastic resin, rubber, or other desirable and suitable yieldable material. One thermoplastic resin that may be mentioned is Vinylite, although as will be understood, there are many vinyl and other resins having yieldable properties and adaptable for this purpose. As stated, rubber may be used as well as any of the many rubber-like plastics.

After the covering has been applied to the rim, as later more fully described, the curved end portions 7 and 8 of the arms 5 and 6 will be placed in corresponding depressions 13 and 14 in the lower hub plate 15, and the top hub plate 16 having complemental depressions then placed thereover and fastened by bolts, screws or the like 17 to the lower hub plate to securely fasten the rim element therebetween, as seen in Fig. 2. As will be understood, the hub plates will be keyed or otherwise fastened to the upper end portion of a steering post (not shown). For ornamental purposes there will be secured to the hub plates a hub housing 18, preferably made in two halves and of a suitable plastic material. If desired the hub construction may be like that shown in Fig. 5 in which stamped metal is used, in which the upper and lower plates are stamped into the desired shape by the use of dies or the like, and when assembled and connected together by marginal rivets or the like, have a sleeve inserted into the central opening, said sleeve having an upper flange supported upon the upper plate and a central opening to receive the steering post.

Also, as indicated by dotted lines in Fig. 1, an additional strengthening arm 19 may be added if desired, and be of any suitable construction, such for example as generally indicated in my Patent No. 2,276,477, granted March 17, 1942, for "Steering wheel." Other forms for such additional stiffening arm may be used as desired, or it may be omitted if the additional stiffness is not preferred.

The usual nut (not shown) will be applied at the top of the steering post to bear against the top of the hub construction and within the hub housing.

The covering or casing 12, which, as described above, is of a yieldable plastic resin or other suitable material, will be applied over the rim by slipping, pulling or otherwise forcing it thereover in any manner desired, including a manual or other pull, or any available means to effect such movement. If desired, air or other pressure, may be applied to the hollow interior of the covering or casing to temporarily slightly enlarge its diameter to such degree as to enable it to be slipped over the exterior of the rim, after which the covering will return to a size sufficiently to grip the rim. It will also be understood that during such enlargement of the covering or casing the remote end will be plugged up or otherwise stopped to permit the application of such interior pressure. During the slipping or otherwise forcing of the covering or casing over the rim a lubricant is applied to the outside of the rim or inside of the casing, to assist such movement, and the lubricant will thereafter dry and cement the covering or casing to the exterior of the rim. Any of the many available lubricants may be used, among which may be mentioned as illustrative only and not in a limiting sense, soap, a phenolic glue, a plasticizing glue, or any other suitable glue, cement, or lubricating agent desired.

The covering or casing, when being applied to the rim will be started over one end of either of the end portions 7 or 8, then pulled or forced around the rim 1 and if desired left to the amount shown (or other amount) in Figure 1 upon the arms 5 and 6, it being understood that these arms may be sufficiently laterally separated while the casing is passing thereover and around the rim. Or the casing may be terminated at any point around the rim or upon the arms desired. The casing or covering will be applied to the rim before the rim is placed into and secured to the hub.

A further feature of my invention is the provision on the tubular rim of either protuberances or depressions as desired, to afford better gripping action on the stearing wheel. In Figures 7 to 10 inclusive, gripping protuberances are shown in the form of rivets, or similar devices, each having a neck 20 and head 21, the neck being snugly inserted in a hole formed at any desired location on the rim, preferably at the top, and the lower face of the head bearing against the rim. Any desired number of these rivets, or similar devices, may be applied to the rim and at any suitable distances apart. When the yieldable covering or casing is forced longitudinally over the rim, as described above, it will subtantially follow the upper contour of each of the rivet heads, and thus form gripping protuberances or humps h to afford more effective grasping of the wheel by the operator. These are clearly shown in Figures 9 and 10, while Figure 7 shows the covering just starting over one of the rivet heads. For conservation of space Figure 7 shows the covering as being started on a fragment of the rim, instead of starting on the free end of one of the end portions 7 and 8 as would actually occur.

Figures 11 and 12 show how a modified form of protuberance or hump is formed in the material of the rim. The rim in this form is provided preferably in its lower face (although other locations could be used) with suitably sized and spaced holes 22, through each of which will be inserted a swaging tool with a rounded end to contact the inner face of the opposite side of the rim. Application of suitable blows, or pressure in a press, or otherwise as desired, to the tool will force the metal of the opposite side of the rim outwardly into a bulge or protuberance 23, over which the yieldable covering 12, hereinbefore described, will be forced and caused to cling thereto when the covering comes to its final rest, thus forming humps or gripping protuberances $h'$ similar to the humps $h$ in Figure 9, and for a similar purpose.

In Figures 13 and 14 I have shown a rim having a continuous slot $a$ through its lower wall, through which slot at suitable intervals a swaging tool may be inserted and under pressure form bulges or protuberances 24 in the opposite wall of the rim, and over which the yieldable covering will be stretched or slipped, as earlier described, resulting in gripping protuberances $h''$ similar to those previously described, and for a similar purpose. Also in the form of Figures 13 and 14 the covering or casing will be extruded, or otherwise formed, with a longitudinal rib 25 which will follow and be positioned in the slot $a$ when the covering is applied to the rim.

In Figures 15 and 16 a similar procedure is followed, except that instead of forming outwardly extending bulges in the rim, suitably spaced depressions 26 are formed, into which the yieldable covering extends as shown in these figures to form gripping depressions.

Differently spaced and differently shaped protuberances or humps and depressions may be used without departing from the spirit of my invention.

Having described my invention, I claim:

In a steering wheel, an elongated metal tubular rim having a circular portion and inwardly extended end portions, means for detachably securing said end portions together, said rim having an elongated slot in its bottom side, and a yieldable ornamental thermoplastic resin covering snugly fitting around the exterior surface of the rim, said covering having in its bottom wall an elongated rib fitting into the slot of the rim, and being of a nature enabling pulling it longitudinally over the rim.

HARRY F. GEORGE.